United States Patent [19]

Grainger

[11] Patent Number: 4,511,006
[45] Date of Patent: Apr. 16, 1985

[54] DRILL BIT AND METHOD OF USE THEREOF

[76] Inventor: Alfred J. Grainger, 66 Oxstalls La., Long Leven, Gloucestershire, England

[21] Appl. No.: 458,503

[22] Filed: Jan. 17, 1983

[30] Foreign Application Priority Data

Jan. 20, 1982 [GB] United Kingdom ............... 8201609
Jan. 20, 1982 [GB] United Kingdom ............... 8201610
Jan. 20, 1982 [GB] United Kingdom ............... 8201611

[51] Int. Cl.³ .................... E21B 10/50; E21B 10/56
[52] U.S. Cl. ........................................ 175/57; 29/511; 76/101 A; 175/329; 175/354; 175/374
[58] Field of Search ............... 175/329, 410, 330, 331, 175/374, 354; 29/511; 76/108 A, 108 R, 101 R, 101 E, 101 A; 407/118, 120; 403/282, 284, 274, 361

[56] References Cited

U.S. PATENT DOCUMENTS

| 1,106,860 | 8/1914 | Bayton | 403/284 X |
| 1,790,613 | 1/1931 | Gildersleeve et al. | 175/354 X |
| 3,720,273 | 3/1973 | McKenry et al. | 175/335 |
| 4,201,421 | 5/1980 | Den Besten et al. | 299/92 X |
| 4,222,446 | 9/1980 | Vasek | 175/329 |
| 4,247,150 | 1/1981 | Wrulich et al. | 175/354 X |
| 4,350,215 | 9/1982 | Radtke | 175/329 |
| 4,351,401 | 9/1982 | Fielder | 175/410 X |
| 4,359,335 | 11/1982 | Garner | 76/108 A X |

FOREIGN PATENT DOCUMENTS 2408425 7/1979 France ............... 407/120

Primary Examiner—Stephen J. Novosad
Attorney, Agent, or Firm—Caesar, Rivise, Bernstein & Cohen, Ltd.

[57] ABSTRACT

The cutting edge of a bit of a rotary drill comprises an agglomerate of natural or synthetic diamond mounted at the free end of a shank freely rotatable in a socket in the body. Preferably the agglomerate and the free end of the shank are cold swaged together and preferably a resilient spring is interposed about the shank between the body and the free end.

12 Claims, 5 Drawing Figures

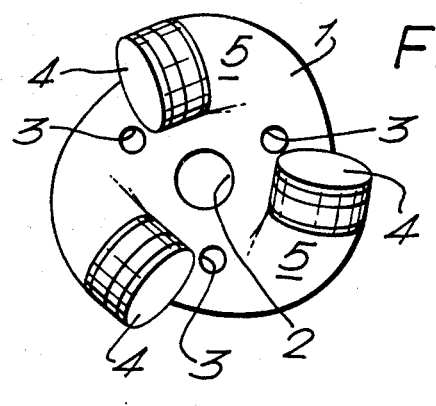
FIG.1.
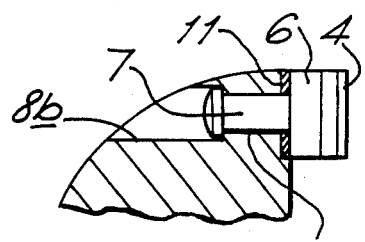
FIG.2.
FIG.3.
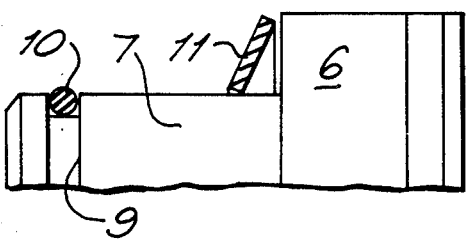
FIG.4.
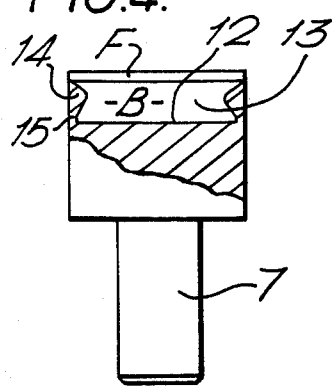
FIG.5.
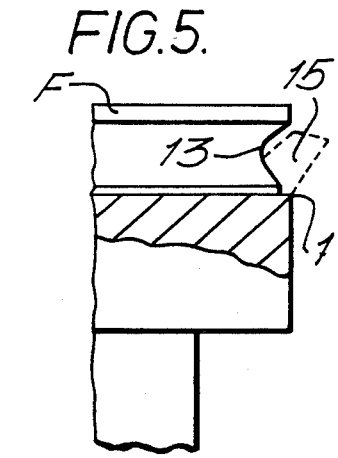

DRILL BIT AND METHOD OF USE THEREOF

The invention relates to bits and in particular to bits for use in drills in making holes in a substrate. One typical but not limitative use of a bit for this invention is in drills to make holes about 50 mm in diameter and about 2 or 3 meters long to receive a charge of explosive material to blast rock and the like to open up a mine shaft or tunnel. Typically such holes are made using a percussive drill which is noisy and dirty to operate.

It is known to use rotary drills in eg. mining, see U.S. Pat. No. 3,820,848 (1974) which discloses a tool having a rotary bit with a cutting point, the bit being secured at its rear end by a resilient ring or washer. It is known to provide a coring bit having at its free end rotary cutting elements formed from eg. tungsten carbide, cemented carbide and the like—see U.S. Pat. No. 2,951,683 (1960). It is also known to provide rotary drill bits for wells in which the cutting elements are free to rotate, see British Pat. No. 1239074 (1971). In the latter two cases, the cutting elements are in disc form and mounted on one end of a rotary shank received in a socket in the bit body.

It is one object of this invention to provide for use in drilling blast holes and the like in substrates, a rotary drill bit having rotary cutting elements comprising synthetic diamond agglomerates and the like, and which are very effective in cutting, quiet in use and of long life.

According to one aspect of the invention, there is provided a drill bit for use in making a hole in a substrate, the bit having a body including at least one socket, one end of a shank being received in the socket, a cutting element being present at the free end of the shank, the shank being free to rotate and thereby rotate the cutting element, the element comprising a backing part and a facing part, the backing part being secured to the free end of the shank characterized in that the facing part comprises an agglomerate of natural or synthetic diamond which provides the cutting edge.

Most preferably there is a plurality of cutting elements. Each cutting element comprises a shaped item of hard abrasive particles and may be moulded of hard abrasive particles or of a hard homogenous material. Preferably, the item is moulded of particles of natural or synthetic diamond, secondary abrasive particles and metal bonding agents. The elements often comprise a thin facing diamond layer and a thicker cemented tungsten carbide backing layer. See for example U.S. Pat. Nos. 3,743,489, 3,745,623, 3,767,371, 4,098,362, 4,109,737 and 4,156,329, the disclosures of which are incorporated herein merely by this reference. The number and arrangement of the cutting elements will vary according to the substrate being cut and the debris to be expelled. For soft rock two cutting elements may be present and for hard rock three cutting elements are usually needed. It has been found that in use the flow of debris tends to rotate the cutting elements and that by virtue of the rotation the debris being expelled is broken up into smaller pieces. Because the cutting elements rotate all or substantially all of the cutting edge of the cutting element is used in the cutting or abrading action. As a result the wear is more evenly distributed and the cutting elements have a longer useful like.

Most preferably the shank comprises a bolt, axle or spindle or the like which is free to rotate. Most preferably the body includes extensions and the sockets are provided in the extensions which are shaped so that the shank(s) received therein incline the cutting element(s) at a side rake and at an angle appropriate to the rate of cutting.

In a much preferred feature of the invention, one end of the shank is received in a socket in the body or body extension and the other end, the free end of the shank, is a holder forming a recess to receive the backing part of the cutting element, the holder or the shank itself being formed of a malleable metal or plastics whereby the holder and the cutting element may be secured together. It is a much preferred feature of the invention to secure the walls of the holder and the element by mechanical deformation eg. cold swaging or the like. For improved locking of the element in the recess, the facing engaging surfaces of the holder and the element may have complementary male and female engaging parts. Temperature may be used, as in brazing, but it is preferred that the element is not subject to heating to a temperature approaching that likely to damage the element.

In another much preferred feature of the invention, a resilient ring or washer is interposed between the rear face of the head of the shank holding the cutting element, and the facing surface of the tool body. The use of the resilient member at such a location tends to assist in urging the cutting element away from the body better to permit rotation of the cutting element in use of the bit.

The shank will be formed of a material according to the method by which the cutting element is secured to the head of the shank. Where the cutting element is secured by mechanical deformation the shank will be of a relatively soft material and this will have the advantage of an increased shock resistance. The shank will then be formed of a material relatively softer than the tool body. Where the cutting element is held to the head of the shank eg. by brazing, then the shank and the tool body will typically be formed of the same or similar material.

The tool body will preferably have at one end means by which it may be connected to a power source, eg. the shank of a rotary drill, arranged to rotate the drill at an appropriate speed. Preferably, a fluid outlet is arranged on the tool body adjacent each cutting element to remove the debris and cuttings away from the working face of the substrate. The tool body will usually be about 50 mm, often up to 100 mm in diameter.

The bit may be incorporated in a variety of rotary tools for a variety of purposes such as cutting, grinding, abrading, and is useful in a variety of industries, especially mining, metalworking and woodworking. It is an advantageous feature of this invention that the bit is used with a rotary drill to make blast holes. A rotary drill is quieter to use than a percussive drill any be mounting the cutting face as described, one can use agglomerates as the cutting edge and obtain the advantages thereof and the cutting elements will withstand the forces generated in use of the rotary drill.

In a modification of the invention the bit is for making a straight hole and includes one cutting element arranged for making the hole, and the bit has a passageway for the removal of cuttings and debris through the hole.

The invention includes a method of making a hole in a substrate comprising rotating the bit at an appropriate speed, preferably from about 200 to 600 rpm, typically 500 rpm, and causing or allowing the cutting element(s) to rotate. This is in contrast to oil well drilling where the speed of rotation is about 50 to 100 rpm. Preferably fluid, liquid or gas, is passed through the body and past the cutting element(s) to remove cuttings and debris.

The invention further includes a method of making for use in a drill bit an assembly of a shank and a cutting element comprising securing together by mechanical deformation the backing part of a cutting elemen and the free end of the shank, preferably in the form of a holder.

In order that the invention may be well understood, it will now be described by way of example with reference to the accompanying diagrammatic drawings, in which:

FIG. 1 is a front end view of a blast hole bit of the invention,

FIG. 2 is a sectional view of a cutting element mounted in the bit of FIG. 1,

FIG. 3 is a sectional view drawn to an enlarged scale of part of FIG. 2,

FIG. 4 is a sectional view of one cutting element of the invention and,

FIG. 5 is an enlarged sectional view of the holder of FIG. 4.

The bit of FIGS. 1 to 3 is connected as by screwing to the shank of a rotary drill, not shown. The bit comprises a bit body 1 having a central cone like carbide bit 2. The body is about 50 mm in diameter and about 80 mm long, and made of steel or alloy steel. Three small water passages 3 are radially spaced about the central bit 2. Three cutting elements 4 are mounted on extensions or shoulders 5 of the bit body 1. Each cutting element 4 comprises a disc like member joined to the head 6 of a bolt of shank 7, (see FIGS. 2 and 3). The bolt may be made of alloy, alloy steel, malleable iron or the like material. The bolt is usually of softer material than the tool body, especially when, as indicated in FIGS. 4 and 5, the cutting element 4 is cold swaged to the shank 7. The bolt is received in a relatively narrower diameter portion 8a of a passageway 8 in the projection 5. An annular recess 9 is present towards the distal end of the bolt 7 and a circlip 10 is received in the recess to lock the bolt in the relatively wider diameter portion 8b of the passageway. The bolt 7 is a relatively easy fit in the passageway portion 8a as a result of which the bolt can rotate freely. A ring 11 of spring metal is present about the bolt 7 between the underside of the head 6 and the facing wall of the extension 5.

As shown in FIGS. 4 and 5, the head of each bolt 7 has a recess 12 which houses the cutting element 4. The upper face of the element is a thin facing diamond layer part F and the lower part is a thicker cemented tungsten carbide backing part B. An annular indentation 13 is present in the backing part B. The side wall 14 of the recess has a corresponding annular bulge 15 at about midheight, and the bulge 15 is received in the indentation 13 to lock the element to the holder. To locate the element in the holder, the sidewall 14 of the holder is splayed out, as shown in ghost outline in FIG. 5. The element 4 is then laid on the floor of the recess 12, and the sidewall 14 is swaged on to the element to key the bulge 15 into the indentation 13. In this way the parts are held together by cold swaging or deformation so avoiding brazing.

In use, the bit is secured to a rotary drill, not shown. The drill is advanced to the face of a mine to open a roadway or shaft. The drill is rotated at about 500 rpm and as the bit rotates the cutting elements 4 are rotated by contact with the substrate and by the flow of debris past the bit and they are resilient urged back against the bias of the spring ring 11. Large lumps between the three cutting elements 4 are broken up by the carbide tip 2. Because the cutting elements are freely rotatable and of the resilient mounting thereof on the bit the drill can cut into the material of the face at a fast rate—1 meter in 40 seconds even in hard rock. Because the drill is rotary rather than percussive, the job was quieter and less messy than is usually the case. A ring of holes is drilled, a blast of explosive is inserted into each hole, the explosive is ignited and the face falls away to allow the mine to be advanced.

I claim:

1. A method of making a small diameter hole in a substrate such as the face of a mine, the method comprising (1) advancing to the mine face a rotary drill having a drill bit of a diameter of from about 50 mm to about 100 mm, the bit having a body including at least one socket, one end of a shank being received in the socket, a cutting element being held in a holder at the free end of the shank, the shank being free to rotate and thereby rotate the cutting element to form a small diameter hole in the substrate, the cutting element comprising a backing part and a facing part, the backing part being received and held by mechanical pressure of the shank, the facing part comprising an agglomerate of natural or synthetic diamond which provides the cutting edge, and (2) rotating the drill bit at a speed of from about 200 to 600 rpm, with the cutting element being caused or allowed to rotate to cut into the substrate and so drill the hole.

2. A method according to claim 1, including passing a fluid through the body and past the cutting element or elements to remove cuttings and debris.

3. A method of making an assembly of a shank and a cutting element for use in a drill bit according to claim 1, comprising securing the backing part of a cutting element to the free end of a shank by mechanical deformation.

4. A method according to claim 3, including providing a recess in the free end of the shank, locating the backing part in the recess and swaging the items together.

5. A method according to claim 3, including engaging complementary side parts of the recess and the cutting element backing part.

6. A rotary drill having a drill bit of a diameter of from about 50 mm to about 100 mm, and adapted for rotation at a speed of from about 200 to 600 rpm, the bit having a body including at least one socket, a cutting element being held in a holder at the free end of the shank, one end of said shank being received in said socket, said shank being free to rotate and thereby rotate the cutting element, said cutting element comprising a backing part and a facing part, the backing part being received and held by mechanical pressure in the holder of the shank, the facing part comprising an agglomerate of natural or synthetic diamond which provides the cutting edge.

7. A bit according to claim 6, in which a resilient ring or washer is present between the facing surfaces of the free end of the shank and the bit body.

8. A bit according to claim 6, in which the shank is formed of a material softer than the body.

9. A bit according to claim 6, in which the body includes passageways for the passage of fluid for removing debris and the flow of fluid and/or contact with the substrate is arranged to cause the cutting element to rotate.

10. A bit according to claim 6, in which the body includes extensions and the sockets are provided in the extensions which are shaped so as to incline the cutting element or elements at a side rake and at an angle appropriate to the rate of cutting.

11. A bit according to claim 6, in which the bit is adapted for use in hard rock and includes at least three cutting elements.

12. A bit according to claim 6, in which the bit is for making a straight hole and includes one cutting element and the body has a passageway for the removal of cuttings and debris.

* * * * *